US008010248B2

(12) United States Patent
Sano

(10) Patent No.: US 8,010,248 B2
(45) Date of Patent: Aug. 30, 2011

(54) DATA RECORDER

(75) Inventor: Yoshiaki Sano, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 992 days.

(21) Appl. No.: 11/870,991

(22) Filed: Oct. 11, 2007

(65) Prior Publication Data

US 2008/0255723 A1 Oct. 16, 2008

(30) Foreign Application Priority Data

Oct. 12, 2006 (JP) .............................. P2006-278329

(51) Int. Cl.
*G01M 17/00* (2006.01)

(52) U.S. Cl. .............. 701/35; 701/14; 701/29; 701/201; 701/207; 701/217; 340/459; 340/436; 340/460; 340/470; 340/991; 280/735; 360/6; 702/176

(58) Field of Classification Search .................... 701/35, 701/29, 187, 14, 201, 217, 207; 280/735; 340/436, 870.41, 460, 459, 991, 994; 360/6; 702/176; 368/6
See application file for complete search history.

(56) References Cited

U.S. PATENT DOCUMENTS

| | | | | |
|---|---|---|---|---|
| 4,337,651 | A * | 7/1982 | Yoshino et al. | 73/129 |
| 4,846,046 | A * | 7/1989 | Kanai et al. | 91/506 |
| 5,652,379 | A * | 7/1997 | Fukatani | 73/117.02 |
| 2003/0130772 | A1 * | 7/2003 | Yanagida et al. | 701/22 |
| 2004/0195022 | A1 * | 10/2004 | Inoue | 180/170 |
| 2007/0198163 | A1 * | 8/2007 | Yasui et al. | 701/103 |
| 2007/0241874 | A1 * | 10/2007 | Okpysh et al. | 340/479 |

FOREIGN PATENT DOCUMENTS

| | | |
|---|---|---|
| JP | 10-63905 A | 3/1998 |
| JP | 2002269697 | 9/2002 |
| JP | 2003056371 | 2/2003 |

* cited by examiner

*Primary Examiner* — James P Trammell
*Assistant Examiner* — McDieunel Marc
(74) *Attorney, Agent, or Firm* — Birch, Stewart, Kolasch & Birch, LLP

(57) ABSTRACT

A data recorder has: a controlled state detecting unit, operable to detect a controlled state of a vehicle by a driver; an operating state detecting unit, operable to detect an operating state of the vehicle; a state recording unit; and a recording condition determination unit, operable to determine whether or not the controlled state and the operating state are recorded in the state recording unit based on at least the controlled state of the controlled and operating states.

6 Claims, 3 Drawing Sheets

DATA RECORDER

BACKGROUND OF THE INVENTION

1. Field of the Invention

The present invention relates to a data recorder.

2. Description of the Related Art

In recent years, there are techniques in which a speedometer for measuring the vehicle speed of a running motor vehicle and an accelerometer for measuring the acceleration thereof are placed on the vehicle so that states of the vehicle such as vehicle speed, acceleration and the like are recorded in a data recorder when an acceleration in a speed reducing direction (hereinafter, referred to as deceleration) that is generated at the time of an accident exceeds a certain value. By analyzing the states of the vehicle recorded in the data recorder, the analysis of the cause of the accident which involved the vehicle is helped. An example of such a related data recorder is disclosed in JP-A-10-63905 below.

In the related data recorder disclosed in JP-A-10-63905, however, since whether or not vehicle states are recorded is determined mainly by deceleration, in the event that an accident occurs due to a sudden start of a vehicle, the vehicle states are not recorded due to deceleration being small, and when it is set to store vehicle states at lower decelerations, the data recorder is activated to record vehicle states even by impact generated when the vehicle runs over bumps in the road.

In addition, in recent years, electronics have been adopted more and more in motor vehicles, and in many cases, a throttle of an engine, for example, is controlled electrically by an ECU. In particular, in electric vehicles, motors which acts as prime motors are controlled electrically completely. Because of this, it is difficult to determine whether a sudden start of the vehicle was triggered by a malfunction of the motors due to abnormal conditions occurring in the electrical system or an erroneous operation by the driver.

SUMMARY OF THE INVENTION

It is therefore an object of the invention to provide a data recorder which can record states of a vehicle when the vehicle is involved in an accident attributed to a sudden start of the vehicle In order to achieve the object, according to the invention, there is provided a data recorder comprising:

a controlled state detecting unit, operable to detect a controlled state of a vehicle by a driver;

an operating state detecting unit, operable to detect an operating state of the vehicle;

a state recording unit; and a recording condition determination unit, operable to determine whether or not the controlled state and the operating state are recorded in the state recording unit based on at least the controlled state of the controlled and operating states.

DETAIL DESCRIPTION OF PREFERRED EMBODIMENTS

Figure 2:
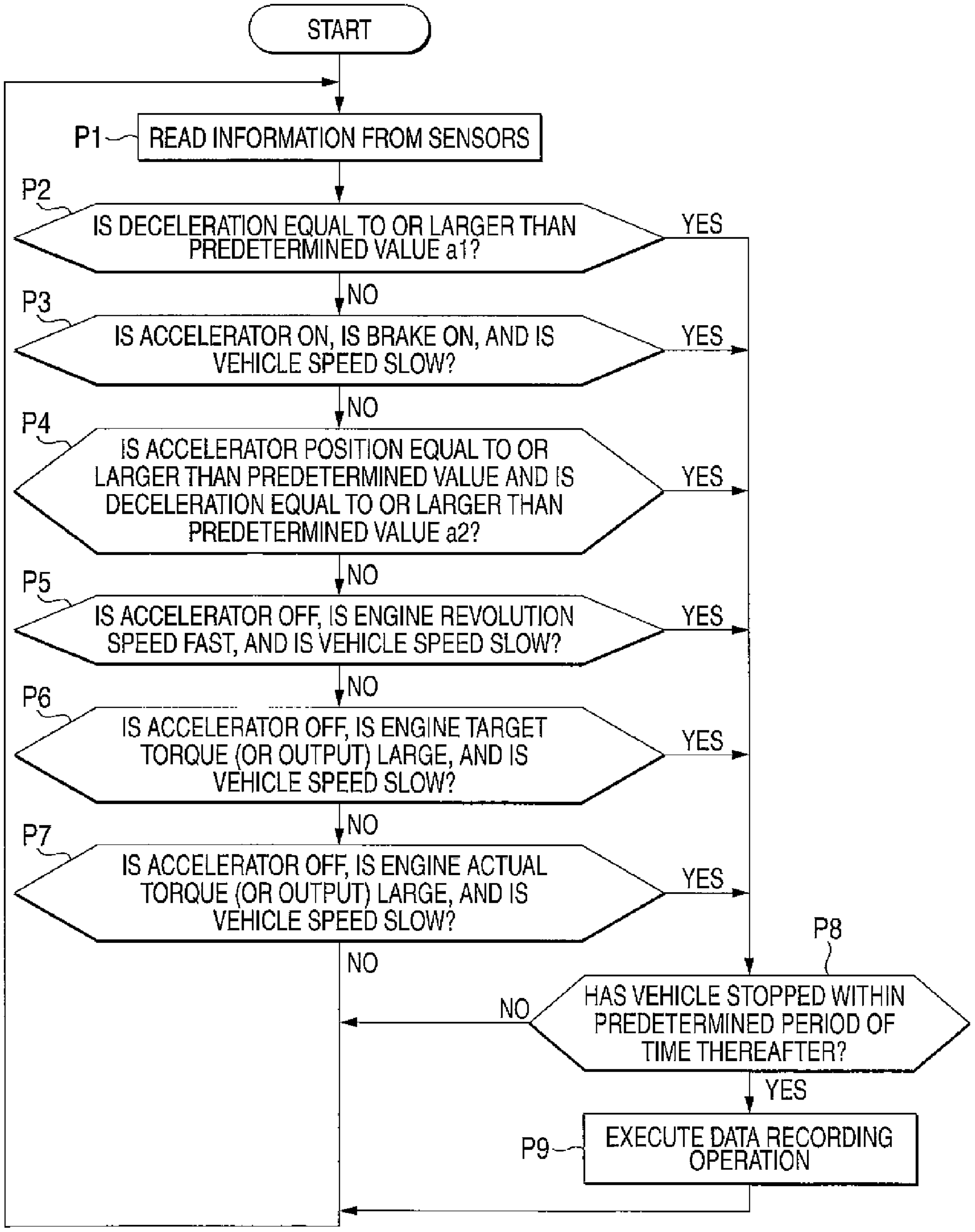
FIG. 2 is a flowchart illustrating a flow of data processing operations in the data recorder according to the embodiment of the invention.
Figure 3:
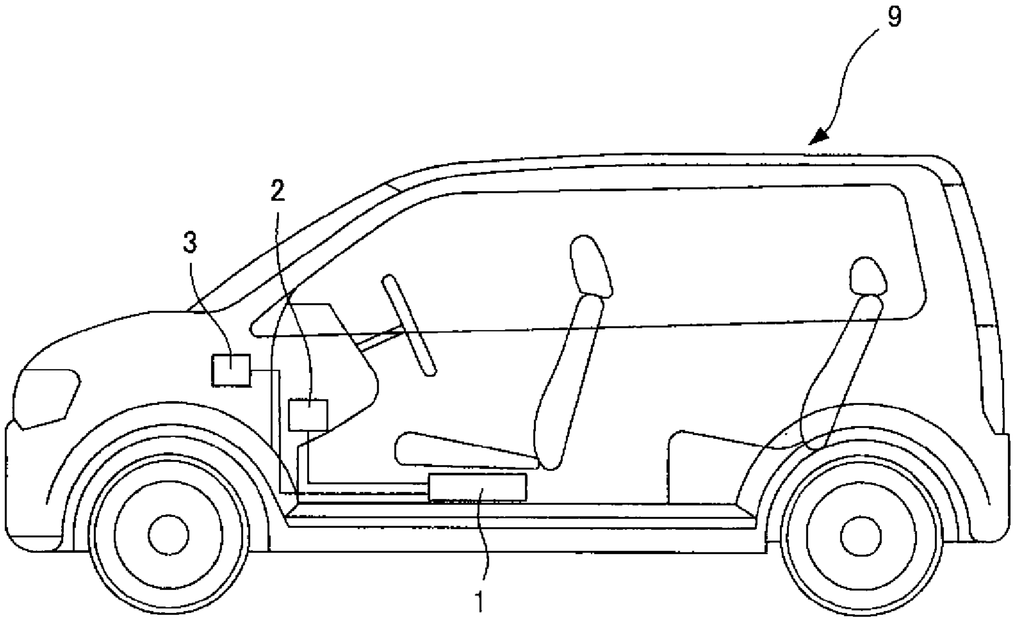
FIG. 3 is a perspective side view of a motor vehicle on which the data recorder according to the embodiment of the invention is installed.

An embodiment of a data recorder according to the invention will be described by employing FIGS. 1 to 3.

Firstly, a data recorder according to the embodiment will be described. As is shown in FIG. 3, a data recorder 1 for recording vehicle states when an accident or the like occurs is placed, for example, underneath a seat within a passenger compartment. This is because the data recorder 1 can be protected from impact when a vehicle 9 is involved in an accident such as a collision. Controlled state detectors 2 for detecting controlled states of the vehicle 9 by the driver such as an accelerator opening or position and operating state detectors 3 for detecting the acceleration in a speed reducing direction (hereinafter, referred to as deceleration) of the vehicle 9 and the speed of the vehicle 9 are connected to the data recorder 1.

Figure 1:
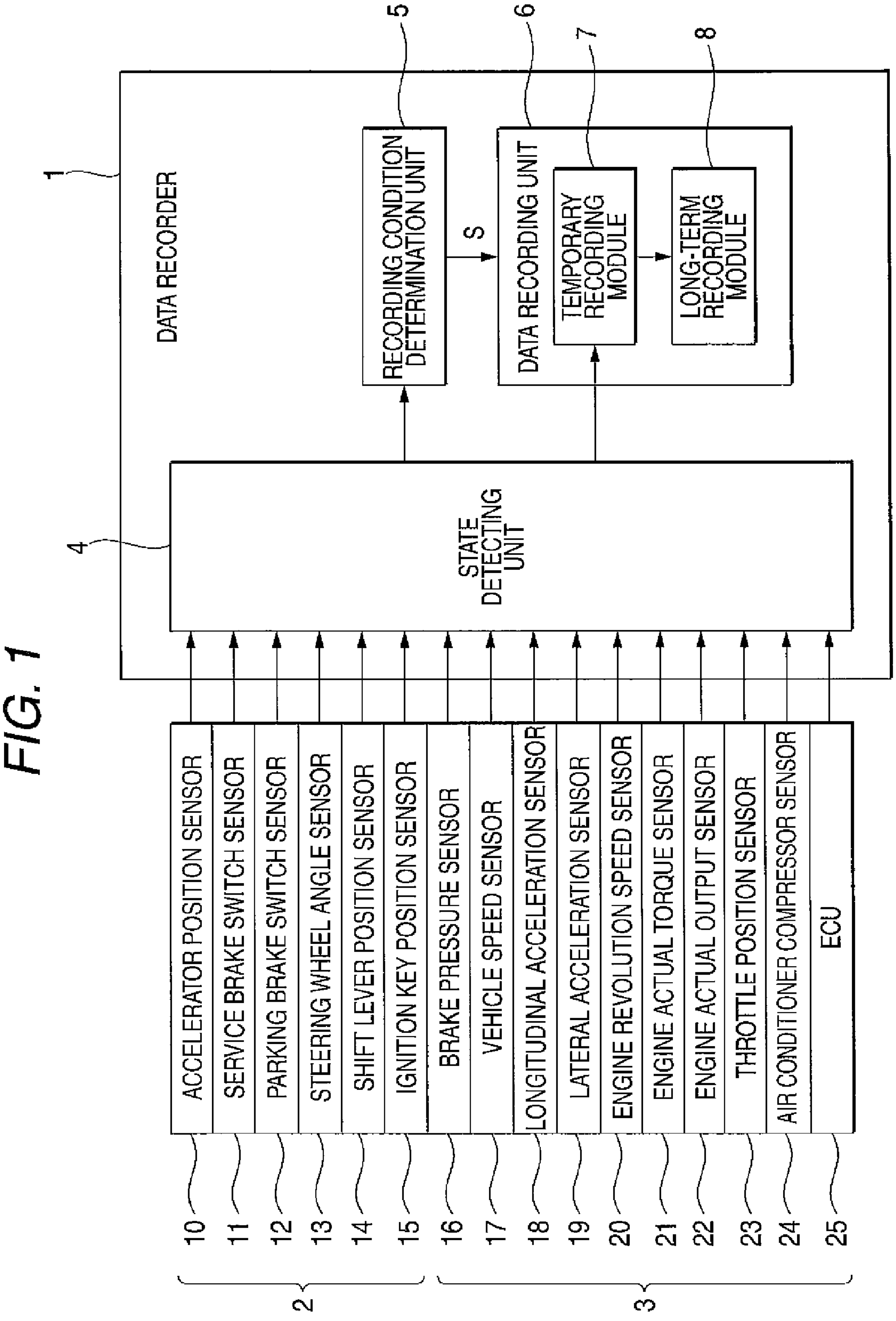
FIG. 1 is a block diagram of a data recorder according to an embodiment of the invention.

As is shown in FIG. 1, a state detecting unit 4 is provided for detecting signals sent from various types of sensors. Hereinafter, the controlled state detectors 2 and the operating state detectors 3 which are connected to the state detecting unit 4 of the data recorder 1 according to the embodiment will be described below.

As the controlled state detectors 2, an accelerator opening or position sensor 10, a service brake switch sensor 11, a parking brake switch sensor 12, a steering wheel angle sensor 13, a shift lever position sensor 14 and an ignition key position sensor 15 are connected to the state detecting unit 4.

The accelerator position sensor 10 detects the opening or position of the accelerator controlled by the driver. Because of this, a period of time when the driver depresses the accelerator can be detected as accelerator on, whereas a period of time when the driver does not depress the accelerator can be detected as accelerator off. The service brake switch sensor 11 detects whether or not the brake pedal is depressed by the driver. Because of this, a period of time when the driver depresses the brake pedal can be detected as service brake on, whereas a period of time when the brake pedal is not depressed by the driver can be detected as service brake off. The parking brake switch sensor 12 detects whether the parking brake is on or off. The steering wheel angle sensor 13 detects the angle through which the steering wheel is steered. The shift lever position sensor 14 detects the shift position which is selected via the shift lever. The ignition key position sensor 15 detects the position which is selected via the ignition key (for example, ON, OFF or ACC).

In this embodiment, while the accelerator position sensor 10, the service brake switch sensor 11, the parking brake switch sensor 12, the steering wheel angle sensor 13, the shift lever sensor 14, and the ignition key position sensor 15 are used as the operated state detectors 2, in addition to these devices, devices for detecting controlled states of the vehicle by the driver can be installed, and the devices that are so installed can be changed as required. In addition, in this embodiment, while the accelerator position sensor 10, the service brake switch sensor 11, the parking brake switch sensor 12, the steering wheel angle sensor 13, the shift lever sensor 14, and the ignition key position sensor 15 are directly connected to the state detecting unit 4, these sensors are connected to an ECU 25, so that information can be outputted from the respective sensors via the ECU 25.

In addition, as the operating state detectors 3, a brake pressure sensor 16, a vehicle speed sensor 17, a longitudinal acceleration sensor 18, a lateral acceleration sensor 19, an engine revolution speed sensor 20, an engine actual torque sensor 21, an engine actual output sensor 22, a throttle opening or position sensor 23, an air conditioner compressor sensor 24 and the ECU 25 are connected to the state detecting unit 4.

The brake pressure sensor 16 detects the hydraulic pressure of brake fluid. The vehicle speed sensor 17 detects the speed of the vehicle 9 (hereinafter, referred to as vehicle speed). The longitudinal acceleration sensor 18 detects the longitudinal acceleration of the vehicle 9. The lateral acceleration sensor 19 detects the lateral acceleration of the vehicle 9. The engine revolution speed sensor 20 detects the revolution speed of the engine. The engine actual torque sensor 21 detects the actual torque of the engine. The engine actual output sensor 22 detects the actual output of the engine. The throttle position sensor 23 detects the opening or position of a throttle valve of the engine. The air conditioner compressor sensor 24 detects whether an air conditioner compressor is in operation or not in operation.

The ECU 25 outputs engine target torque information, engine target output information, a target idle speed information, odometer information, time information, current position information, and failure code information. The engine target torque information is a torque of the engine which the ECU 25 determines as a target value. The engine target output information is an output of the engine which the ECU 25 determines as a target value. The target idle speed information is an idling speed of the engine which the ECU 25 regards as a target value. The odometer information is a mileage covered by the vehicle. The time information is a time obtained from a clock on the vehicle. The current position information is a position of the vehicle 9 obtained from the GPS by the ECU 25. The failure code information is a code which represents the result of a failure diagnostic testing performed by the ECU 25.

In this embodiment, while the brake pressure sensor 16, the vehicle speed sensor 17, the longitudinal acceleration sensor 18, the lateral acceleration sensor 19, the engine revolution speed sensor 20, the engine actual torque sensor 21, the engine actual output sensor 22, the throttle opening or position sensor 23, the air conditioner compressor sensor 24 are used as the operating state detectors 3, in addition to these devices, devices for detecting operating states of the vehicle 9 can be installed, and the devices to be placed can be changed as required. In addition, in this embodiment, while the brake pressure sensor 16, the vehicle speed sensor 17, the longitudinal acceleration sensor 18, the lateral acceleration sensor 19, the engine revolution speed sensor 20, the engine actual torque sensor 21, the engine actual output sensor 22, the throttle opening or position sensor 23, the air conditioner compressor sensor 24 are connected directly to the state detecting unit 4, these can be connected to the ECU 25, so that information can be made to be outputted from the respective sensors via the ECU 25.

In addition, in this embodiment, while the engine target torque information, the engine target output information, the target idle speed information, the odometer information, the time information, the current position information and the failure code information are made to be outputted from the ECU 25, in addition to these pieces of information, information indicating operating states of the vehicle 9 can be outputted, and the pieces of information to be outputted can be varied as required.

A data recording unit 6 for recording vehicle state data (controlled states and operating states) sent from the controlled states detectors 2 and the operating state detectors 3 is connected to the state detecting unit 4 of the data recorder 1. In this data recording unit 6, a temporary recording module 7 is provided for recording vehicle state data sent from the state detecting unit 4 in time series continuously and temporarily. This temporary recording module 7 deletes old vehicle state data while recording fresh vehicle state data so as to record vehicle state data for a certain period of time. In addition, in the data recording unit, a long-term recording module 8 is provided for recording the vehicle state data recorded in the temporary recording module 7 that is necessary to be kept recorded for a long period of time. In this way, by including the temporary recording module 7 and the long-term recording module 8, the data recording unit 6 is made able to record necessary vehicle state data for a long period of time while backtracking to the previous vehicle state data. In addition, since only the necessary vehicle state data can be kept recorded for a long period of time, the recording capacity of the long-term recording module 8 can be suppressed to a required minimum level, thereby making it possible to realize a reduction in costs.

Furthermore, connected to the state detecting unit 4 of the data recorder 1 is a recording condition determination unit 5 for determining whether or not vehicle state data needs to be recorded in the data recording unit 6 based on the vehicle state data detected in the state detecting unit 4. This recording condition determination unit 5 is connected to the data recording unit 6, and when determining that vehicle state data is necessary to be recorded (hereinafter, referred to as a recording reference time), the recording condition determination unit 5 transmits a data recording start signal s to the data recording unit 6 which instructs the data recording unit 6 to start a long-term recording of vehicle state data, so that the vehicle state data recorded in the temporary recording module 7 of the data recording unit 6 is caused to be recorded in the long-term recording module 8. The vehicle state data that is recorded in the long-term recording module 8 as this occurs is the vehicle state data that has been recorded a predetermined time, for example, five seconds before and after the recording reference time, that is, the vehicle state data recorded over a total of 10 seconds across the recording reference time.

Next, the flow of data processing operations in the data recorder 1 according to the embodiment will be described based on FIG. 2. As is shown in FIG. 2, in step P1, the data recorder 1 outputs vehicle state data sent from the controlled state detectors 2 and the operating state detectors 3 to the state detecting unit 4. The vehicle state data detected in the state detecting unit 4 is read into the recording condition determination unit 5. Namely, the information of the sensors or the like is captured into the recording condition determination unit 5.

In step P2, as a first determination condition, the recording condition determination unit determines whether or not an acceleration in a speed reducing direction (hereinafter, referred to as deceleration) that was detected by the longitudinal acceleration sensor 18 is equal to or larger than a predetermined value a1 (for example, on the order of 2 G). If the first determination condition is established, the recording condition determination unit 5 executes step P8, while the recording condition determination unit 5 executes step P3 in other cases.

In step P3, as a second determination condition, the recording condition determination unit 5 determines whether or not the controlled state of the accelerator detected by the accelerator position sensor 10 is the state of accelerator on, the operated state of the service brake detected by the service brake switch sensor 11 is the state of brake on, and the vehicle speed detected by the vehicle speed sensor 17 is a small value which is equal to or slower than a predetermined value (for example, on the order of 20 to 30 km/h). If the second determination condition is met, the recording condition determination unit 5 executes step P8, while the recording condition determination unit 5 executes step P4 in other cases.

In step P4, as a third determination condition, the recording condition determination unit 5 determines whether or not the accelerator position detected by the accelerator position sensor 10 is equal to or larger than a predetermined value (for example, on the order of 10 percent of the position attained when the accelerator is fully depressed) and the deceleration of the vehicle detected by the longitudinal acceleration sensor 18 is equal to or larger than a predetermined value a2 (for example, on the order to 1.0 to 2.0 G). Note that the predetermined value a2 for deceleration here is of the order of a limit deceleration when brakes are applied and is made to be smaller than the predetermined value al for deceleration in step P2. Namely, a2<a1. If the third determination condition is established, the recording condition determination unit 5 executes step P8, while the recording condition determination unit 5 executes step P5 in other cases.

In step P5, as a fourth determination condition, the recording condition determination unit 5 determines whether or not the controlled state of the accelerator detected by the accelerator position sensor 10 is the state of accelerator off, the engine revolution speed detected by the engine revolution speed sensor 20 is a large value which is equal to or larger than a predetermined value (for example, 2500 to 3000 rpm in the case of an internal combustion engine, and in the case of an electric motor, several hundreds revolutions per minute), and the vehicle speed detected by the vehicle speed sensor 17 is the small value which is equal to or slower than the predetermined value (for example, on the order of 20 to 30 km/h). If the fourth determination condition is established, the recording condition determination unit 5 executes step P8, while the recording condition determination unit 5 executes step P6 in other cases.

In step P6, as a fifth determination condition, the recording condition determination unit 5 determines whether or not the controlled state of the accelerator detected by the accelerator position sensor 10 is the state of accelerator off, an engine target torque for the engine target torque information sent from the ECU 25 is a large value which is equal to or larger than a predetermined value (for example, on the order of 10% of the maximum torque of the engine) or an engine target output for the engine target output information sent from the ECU 25 is a large value which is equal to or larger than a predetermined value (for example, on the order of 10% of the maximum output of the engine), and the vehicle speed detected by the vehicle speed sensor 17 is the small value which is equal to or slower than the predetermined value (for example, on the order of 20 to 30 km/h). If the fifth determination condition is established, the recording condition determination unit 5 executes step P8, while the recording condition determination unit 5 executes step P7 in other cases.

In step P7, as a sixth determination condition, the recording condition determination unit 5 determines whether or not the controlled state of the accelerator detected by the accelerator position sensor 10 is the state of accelerator off, the engine actual torque detected by the engine actual torque sensor 21 is a large value which is equal to or larger than a predetermined value (for example, on the order of 10% of the maximum torque of the engine) or the engine actual output detected by the engine actual output sensor 22 is a large value which is equal to or larger than a predetermined value (for example, on the order of 10% of the maximum output of the engine), and the vehicle speed detected by the vehicle speed sensor 17 is the small value which is equal to or slower than the predetermined value (for example, on the order of 20 to 30 km/h). If the sixth determination condition is established, the recording condition determination unit 5 executes step P8, while the recording condition determination unit 5 executes step P1 again in other cases.

In step P8, as a seventh determination condition, the recording condition determination unit 5 determines whether or not the vehicle has stopped within a predetermined time (for example, on the order of three seconds) after the recording reference time. If the seventh determination condition is established, the recording condition determination unit 5 executes step P9, while if otherwise, the recording condition determination unit 5 executes step P1 again.

In step P9, transmitting a data recording start signal s to the data recording unit 6, the recording condition determination unit 5 causes the long-term recording module 8 of the data recording unit 6 to record vehicle state data. As this occurs, the vehicle state data recorded in the long-term recording module 8 is the vehicle state data which is buffered in the temporary recording module 7 of the data recording unit 6 and which was recorded within the predetermined period of time before and after (for example, on the order of five seconds before and after) the recording reference time.

In addition, items of the vehicle state data recorded in the long-term recording module 8 then are accelerator position sensor output data, service brake switch sensor output data, parking brake switch sensor output data, steering wheel angle sensor output data, shift lever position sensor output data, ignition key position sensor output data, brake pressure sensor output data, vehicle speed sensor output data, longitudinal acceleration sensor output data, lateral acceleration sensor output data, engine revolution speed sensor output data, engine actual torque sensor output data, engine actual output sensor output data, throttle position sensor output data, air conditioner compressor sensor output data, and engine target torque information, engine target output information, target idle speed information, odometer information, time information, current position information, and failure code information in the output data of the ECU. In addition, as to the odometer information, time information and current position information, only one data may be recorded during the recording reference time. In this way, in the embodiment, while the items are made to be the vehicle state data that is recorded in the long-term recording module 8, other items than those described above can be recorded, and the items to be recorded can be altered as required.

The recording condition determination unit 5 executes step P1 again after it has transmitted the data recording start signal s to the data recording unit 6. Note that the operations from step P1 to step P9 are started when the ignition key is positioned in ON or ACC and continue to be repeated until the ignition key is positioned in OFF.

As has been described above, the sudden start accident caused by the erroneous operation by the driver can accurately be determined based not on deceleration but on the controls performed by the driver from the aforesaid second determination condition and seventh determination condition, whereby the required vehicle state data can be recorded. In addition from the third determination condition and seventh determination condition, the sudden start accident caused by the erroneous operation by the driver can accurately be determined through smaller impact based not only on deceleration but also on the controls performed by the driver, whereby the required vehicle state data can be recorded. Furthermore, from the fourth, fifth or sixth determination condition and the seventh determination condition, the sudden start accident caused by the malfunction of the vehicle 9 due to abnormal conditions occurring in the electrical system can accurately be determined, whereby the required vehicle state data can be recorded. In addition, by analyzing the vehicle state data so recorded, the causes for the sudden start accidents can be located.

According to an aspect of the invention, the occurrence of necessity of storing controlled states and operating states due to an accident or the like can accurately determined so as to store the required information.

According to an aspect of the invention, an abnormal condition can accurately be determined even with a small impact generated in association with an accident by a sudden start of the vehicle, thereby making it possible to record the controlled state and the operating states needed.

According to an aspect of the invention, only necessary vehicle state data can be recorded for a long period of time, and therefore, the recording capacity of the recording unit can be suppressed to a required minimum level, thereby making it possible to reduce costs involved.

What is claimed is:

1. A data recorder comprising:

a controlled state detecting unit, operable to detect a controlled state of a vehicle by a driver;

an operating state detecting unit, operable to detect an operating state of the vehicle;

a state recording unit; and a recording condition determination unit that determines whether or not the controlled state and the operating state are to be recorded in the state recording unit based on at least the controlled state of the controlled and operating states, the recording condition determination unit, reads, as the controlled state, a controlled state of an accelerator by the driver and a controlled state of a service brake by the driver, and reads, as the operating state, a vehicle speed, and determines that the controlled state and the operating state are to be recorded in the state recording unit when a recording condition in which the accelerator is controlled, the service brake is controlled, and the vehicle speed is equal to or lower than a predetermined value, is established.

2. The data recorder as set forth in claim 1, wherein the recording condition determination unit determines that the controlled state and the operating state are to be recorded in the state recording unit only when the vehicle stops within a predetermined period of time after the recording condition has been established.

3. A data recorder, comprising:

a controlled state detecting unit, operable to detect a controlled state of a vehicle by a driver;

an operating state detecting unit, operable to detect an operating state of the vehicle;

a state recording unit; and a recording condition determination unit that determines whether or not the controlled state and the operating state are to be recorded in the state recording unit based on at least the controlled state of the controlled and operating states, the recording condition determination unit, reads, as the controlled state, a controlled state of an accelerator by the driver, and reads, as the operating state, a vehicle deceleration, and determines that the controlled state and the operating state are to be recorded in the state recording unit when a recording condition in which the accelerator is controlled and the vehicle deceleration is equal to or larger than a predetermined value, is established.

4. A data recorder, comprising:

a controlled state detecting unit, operable to detect a controlled state of a vehicle by a driver;

an operating state detecting unit, operable to detect an operating state of the vehicle;

a state recording unit; and a recording condition determination unit that determines whether or not the controlled state and the operating state are to be recorded in the state recording unit based on at least the controlled state of the controlled and operating states, the recording condition determination unit, reads, as the controlled state, a controlled state of an accelerator by the driver, and reads, as the operating state, a revolution speed of an engine of the vehicle, and determines that the controlled state and the operating state are to be recorded in the state recording unit when a recording condition in which the accelerator is not controlled and the revolution speed is equal to or faster than a predetermined value, is established.

5. The data recorder as set forth in claim 3, wherein the recording condition determination unit determines that the controlled state and the operating state are to be recorded in the state recording unit only when the vehicle stops within a predetermined period of time after the recording condition has been established.

6. The data recorder as set forth in claim 4, wherein the recording condition determination unit determines that the controlled state and the operating state are to be recorded in the state recording unit only when the vehicle stops within a predetermined period of time after the recording condition has been established.

* * * * *